US011659592B2

(12) United States Patent
Talarico et al.

(10) Patent No.: US 11,659,592 B2
(45) Date of Patent: May 23, 2023

(54) CONTENTION WINDOW ADJUSTMENT MECHANISMS FOR FELAA SYSTEMS

(71) Applicant: APPLE INC., Cupertino, CA (US)

(72) Inventors: Salvatore Talarico, Sunnyvale, CA (US); Jeongho Jeon, San Jose, CA (US); Wenting Chang, Beijing (CN); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/250,360

(22) Filed: Jan. 17, 2019

(65) Prior Publication Data

US 2019/0159256 A1 May 23, 2019

Related U.S. Application Data

(60) Provisional application No. 62/619,381, filed on Jan. 19, 2018, provisional application No. 62/619,249, filed on Jan. 19, 2018.

(51) Int. Cl.
*H04W 74/08* (2009.01)
*H04W 16/14* (2009.01)
*H04L 1/1867* (2023.01)
*H04L 1/1812* (2023.01)
*H04W 84/04* (2009.01)

(52) U.S. Cl.
CPC ......... *H04W 74/0808* (2013.01); *H04L 1/187* (2013.01); *H04L 1/1887* (2013.01); *H04W 16/14* (2013.01); *H04L 1/1812* (2013.01); *H04W 84/042* (2013.01)

(58) Field of Classification Search
USPC ....... 370/229, 230, 235, 236, 252, 328, 329, 370/330, 348, 445, 458, 459, 468
See application file for complete search history.

(56) References Cited

U.S. PATENT DOCUMENTS

| 6,285,662 B1 * | 9/2001 | Watanabe ......... H04W 74/0841 370/280 |
| 2017/0005768 A1 * | 1/2017 | Yin ....................... H04W 74/02 |

(Continued)

OTHER PUBLICATIONS

3GPP TSG-RAN WG1 Meeting #91; R1-1720374; Reno, USA; Nov. 27-Dec. 1, 2017; Source: Ericsson; Title: on AUL Channel Access (Year: 2017).*

(Continued)

*Primary Examiner* — Nguyen H Ngo
(74) *Attorney, Agent, or Firm* — Fay Kaplun & Marcin, LLP

(57) ABSTRACT

An apparatus of a Fifth Generation NodeB (gNB) to operate in a License Assisted Access (LAA) system configures a transmission initiation time interval contention window size (CWS) of N number of subframes between Category 4 Listen Before Talk (LBT) uplink (UL) transmissions by a user equipment (UE) operating in the LAA system, and a memory to store a value of N which can have a value 6 or greater or 10 or greater. An apparatus of a UE to operate in an LAA system decodes a configuration from the gNB of a transmission initiation time interval contention CWS of N number of subframes between Category 4 LBT UL transmissions in the LAA system. The CWS is increased to a next higher value when an UL grant or an autonomous UL (AUL) downlink feedback indicator (DFI) is not received before the expiration of a timer.

14 Claims, 7 Drawing Sheets

(56) References Cited

U.S. PATENT DOCUMENTS

| | | | | |
|---|---|---|---|---|
| 2017/0086225 | A1* | 3/2017 | Ljung | H04B 17/318 |
| 2018/0027590 | A1* | 1/2018 | Yerramalli | H04W 16/14 |
| | | | | 370/328 |
| 2018/0288790 | A1* | 10/2018 | Kim | H04W 72/1278 |
| 2018/0288805 | A1* | 10/2018 | Bhorkar | H04L 5/0048 |
| 2018/0352573 | A1* | 12/2018 | Yang | H04W 76/27 |
| 2019/0007972 | A1* | 1/2019 | Gou | H04W 16/14 |
| 2019/0149270 | A1* | 5/2019 | Liu | H04W 72/0446 |
| | | | | 370/329 |
| 2019/0150196 | A1* | 5/2019 | Koorapaty | H04L 1/1812 |
| | | | | 370/329 |
| 2019/0208544 | A1* | 7/2019 | Jia | H04W 72/10 |
| 2020/0015252 | A1* | 1/2020 | Kim | H04W 74/0808 |
| 2020/0045734 | A1* | 2/2020 | Park | H04W 72/0446 |
| 2020/0100295 | A1* | 3/2020 | Pao | H04L 5/0092 |
| 2020/0229227 | A1* | 7/2020 | Babaei | H04W 74/0808 |
| 2020/0275484 | A1* | 8/2020 | Xu | H04W 72/14 |
| 2020/0374933 | A1* | 11/2020 | Lou | H04W 74/0808 |
| 2020/0404648 | A1* | 12/2020 | Kim | H04W 72/0446 |

OTHER PUBLICATIONS

3GPP TSG-RAN WG1 Meeting #91; R1-1720374; Reno, USA; Nov. 17-Dec. 1, 2017; Source: Ericsson; Title: on AUL Channel Access (Year: 2017).*

* cited by examiner

CONTENTION WINDOW ADJUSTMENT MECHANISMS FOR FELAA SYSTEMS

CROSS-REFERENCE TO RELATED APPLICATIONS

The present application claims the benefit of U.S. Provisional Application No. 62/619,381 filed Jan. 19, 2018 and U.S. 62/619,249 file Jan. 19, 2018. Said Application No. 62/619,381 and said Application No. 62/619,249 are hereby incorporated herein by reference in their entireties.

BACKGROUND

Owing to the popularity of mobile and smart devices, the recent widespread adoption of wireless broadband has resulted in a tremendous growth in the volume of mobile data traffic and has radically changed system requirements. For instance, while it has become useful to lower the complexity, elongate the battery life, and support the high mobility and service continuity of the devices, higher data rate and bandwidth and lower latency are also useful to support modern applications. In order to meet the expectations of future wireless networks, several physical layer techniques have been introduced including multiple-input, multiple-output (MIMO) techniques, enhanced inter cell interference coordination (ICIC), coordinated multi-point designs, and so on. More recently, an increasing interest has risen in operating cellular networks in unlicensed spectrum to cope the scarcity of licensed spectrum in low frequency band with the aim to further enhance the rate.

In this context, one of the major enhancement for Release 13 of the Third Generation Partnership Project (3GPP) Long Term Evolution (LTE) standard has been to enable operation in unlicensed spectrum via Licensed Assisted Access (LAA) which expands the system bandwidth by utilizing flexible carrier aggregation (CA) framework introduced by the LTE-Advanced (LTE-A) systems. Enhanced operation of LTE systems in unlicensed spectrum is also expected in future releases including Fifth Generation (5G) systems. Potential LTE operation in unlicensed spectrum includes but is not limited to LTE operation in unlicensed spectrum via dual connectivity (DC), referred to as DC based LAA, and standalone LTE operation in unlicensed spectrum, where LTE-based technology solely operates in unlicensed spectrum without requiring an "anchor" in a licensed spectrum, which is referred to as MulteFire.

The unlicensed frequency band of current interest in 3GPP is the 5 GHz band, which has a wide spectrum with global common availability. The 5 GHz band in the US is governed by Unlicensed National Information Infrastructure (U-NII) rules by the Federal Communications Commission (FCC). The main incumbent system in the 5 GHz band is Wireless Local Area Networks (WLAN), specifically networks operating in accordance with an Institute of Electrical and Electronics Engineers (IEEE) 802.11 a/n/ac standard. Since WLAN systems are widely deployed both by individuals and operators for carrier-grade access service and data offloading, enough care should be taken before the deployment. Therefore, Listen-Before-Talk (LBT) is considered by as a mandatory feature of 3GPP Release 13 LAA systems for fair coexistence with the incumbent system. LBT is a procedure wherein radio transmitters first sense the medium and then transmit only if the medium is sensed to be idle.

During 3GPP Release 13 and Release 14 study of LAA Release-13/14, a scheduled based uplink (SUL) design is considered, wherein UL physical uplink shared channel (PUSCH) transmission is determined based on an explicit UL grant transmission via physical downlink control channel (PDCCH), for example via downlink control information (DCI) format 0A. The UL grant transmission is performed after completing an LBT procedure at an evolved NodeB (eNB). After receiving the UL grant, the scheduled user equipment UE is expected to perform a short LBT or Category 4 (Cat-4) LBT during the allocated time interval. If the LBT is successful at the scheduled UE, then UE transmits PUSCH on the resources indicated by the UL grant.

During the Work Item (WI) phase of Release 13 and Release 14 LAA, it has been identified that UL performance in unlicensed spectrum is significantly degraded. The main cause of this UL starvation is due to the double LBT requirements at both eNB when sending the UL grant, and at the scheduled UEs before transmission. This is a problem when a scheduled system such as LTE coexists with an un-scheduled autonomous system such as Wi-Fi. In order to enhance the performance of uplink transmission, autonomous uplink (AUL) transmission has been proposed. Enabling AUL is one working item considered for 3GPP Release 15 on further enhanced LAA (FeLAA).

For both AUL and SUL, the LBT mechanism designed for LAA fundamentally resembles carrier-sense multiple access with collision avoidance (CSMA/CA) of WLAN, and the size of the LAA contention window is variable between X and Y extended clear channel assessment (ECCA) slots, where X and Y are the minimum and maximum contention window sizes (CWSs). In LAA, the contention window sized (CWS) is adapted based on the hybrid automatic repeat request-acknowledgment (HARQ-ACK) feedback and can be increased to the next higher value if a Category 4 LBT UL (SUL/AUL) transmission is initiated at least N subframes after the start of a previous Category 4 LBT UL (SUL/AUL) transmission. In this last case, the value of N should be selected opportunely to allow the full utilization of the resources available for the AUL transmission within the maximum channel occupancy time (MCOT), and an efficient switching for AUL downlink feedback information, as well as for downlink (DL) transmission and preparation for grant-less UL (GUL) transmission through UL grant transmissions.

When an AUL UE acquires the channel by performing a channel access procedure, the AUL is allowed to perform an UL transmission within the acquired MCOT. If the UL transmission is shorter than the acquired MCOT the acquired resources are lost. In order to better utilize the resources acquired, the remaining unutilized MCOT can be shared with the eNB.

For AUL UEs configured to occupy full bandwidth mode, there is a high likelihood that multiple of these UEs start simultaneously transmission and collide with each other. In order to reduce intra-cell collisions, UEs can be configured with random AUL-specific start offsets, which provide the UEs with different priority to access the channel mitigating the change of colliding with each other. When AUL UEs are instead configured to occupy partial bandwidth, in order to better utilize the frequency/time resources available, an exact start offset is more appropriate. In both cases, the PUSCH starting position is aligned for different AUL, and a cyclic prefix (CP) extension is used for transmissions before the next allowed transmission boundary where the PUSCH transmission starts. While according to current agreements, a CP extension is transmitted from the AUL starting position until the start of symbol number one, no agreements have been made regarding the set of values allowed for the AUL starting position for both full bandwidth and partial bandwidth mode either when within or without the COT acquired by the eNB.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
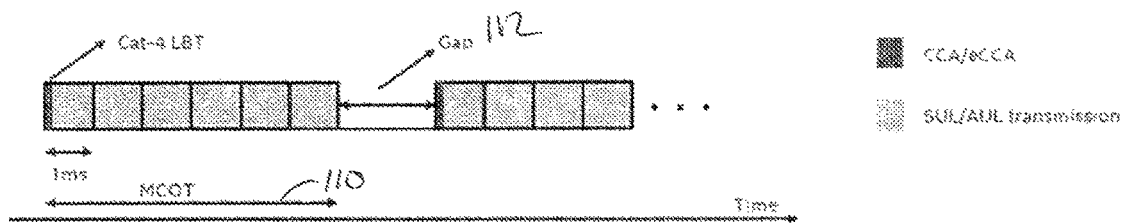
FIG. 1 is a diagram of two Category-4 LBT SUL/AUL transmissions having a gap therebetween in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

Referring now to FIG. 1, a diagram of two Category-4 listen before talk (LBT) scheduled based uplink/autonomous uplink (SUL)/(AUL) transmissions having a gap therebetween in accordance with one or more embodiments will be discussed. In legacy Licensed Assisted Access (LAA), the contention window size (CWS) is adapted based on hybrid automatic repeat request-acknowledgment (HARQ-ACK) feedback. HARQ-ACK feedback can take a value from acknowledgment (ACK), negative acknowledgment (NACK), and discontinuous transmission (DTX), where ACK refers to the situation of correct reception, NACK refers to the situation where control information is correctly detected but there is an error in the data reception, and DTX refers to the situation when a user equipment (UE) misses control message containing scheduling information, rather than the data itself. The size of the LAA contention window is variable between X and Y extended clear channel assessment (ECCA) slots, where X and Y are the minimum and maximum CWSs, respectively. The ECCA slot duration is at least 9 μs, which is exactly the same as a Wireless Local Area Network (WLAN) slot. Based on the LBT priority class, the LBT parameters and maximum channel occupancy time (MCOT) values have been agreed in Third Generation Partnership Project (3GPP) Release 14 to be the one reported in Table 1, below.

TABLE 1

LBT parameters and MCOT values agreed in Rel-14 eLAA

| LBT priority class | n | CWmin | CWmax | MCOT | Set of CW sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms (see note 1) or 10 ms (see note 2) | {15, 31, 63, 127, 255, 511, 1023} |
| 4 | 7 | 15 | 1023 | 6 ms (see note 1) or 10 ms (see note 2) | {15, 31, 63, 127, 255, 511, 1023} |

NOTE 1:
The MCOT of 6 ms may be increased to 8 ms by inserting one or more gaps. The minimum duration of a pause shall be 100 μs. The maximum duration (Channel Occupancy) before including any such gap shall be 6 ms. The gap duration is not included in the channel occupancy time.
NOTE 2:
If the absence of any other technology sharing the carrier can be guaranteed on a long-term basis (e.g. by level of regulation), the maximum channel occupancy time (MCOT) for LBT priority classes 3 and 4 is for 10 ms, otherwise, the MCOT for LBT priority classes 3 and 4 is 6 ms as in note 1.

In further enhanced LAA (FeLAA), the CWS may be changed based on some specific rules. For instance, given HARQ identity reference (HARQ_ID_ref) the HARQ ID of the reference subframe, the CWS of all priority classes at the UE is reset for all the priority classes if:

A UL grant is received and the new data indicator (NDI) bit for at least one of the active HARQ processes (i.e. transport block (TB) not disabled) of HARQ_ID_ref is toggled; or An AUL Downlink feedback information is received and indicates ACK for at least one of the active HARQ processes, wherein the transport block (TB) is not disabled, of HARQ_ID_ref;

and it is increased to the next higher value if:

A UL grant is received and the new data indicator (NDI) bit of the active HARQ processes of HARQ_ID_ref is not toggled, or A UL grant is received and does not schedule HARQ_ID_ref, or An AUL downlink feedback information is received and indicates NACK for the active HARQ processes, wherein the transport block (TB) is not disabled, of HARQ_ID_ref, or A category 4 LBT UL (SUL/AUL) transmission is initiated at least N subframes after the start of a previous Category-4 LBT UL(SUL/AUL) transmission without the reception of any UL grant or autonomous UL downlink feedback indication (AUL-DFI) in between.

In this last case, the value of N must be picked keeping in mind the optimal resources allocation when performing the AUL transmission within the maximum channel occupancy time (MCOT), efficient switching for AUL downlink feedback information, and constraints related to regulation.

Initiation Time Interval for Cat-4 LBT

In one embodiment, the value of N is chosen such that it might fall within the MCOT. For instance, N may assume value of 1, 2, 3, 4 or 5. In one embodiment, the value of N is chosen such that it does not prohibit the full utilization of the allowed MCOT. In one embodiment, the value of N corresponds to 6 or 10 depending on whether the absence of any other technology sharing the carrier can be guaranteed on a long term basis or not, which corresponds to enabling Category-4 (Cat-4) LBT UL (SUL/AUL) transmission soon after the completion of another Cat-4 LBT UL (SUL/AUL) transmission. This, however, would lead to the issue that between the two transmissions there would not be time available for sending the corresponding HARQ-ACK feedback.

In one embodiment, after the completion of MCOT 110, there should be some time provisioned to the evolved NodeB (eNB) to send corresponding HARQ-ACK feedback as the eNB has to perform channel access in order to send the feedback. In this matter, in one embodiment, since for LBT priority class 4 the MCOT is (as shown in Table 1) 6 ms or 10 ms, if the absence of any other technology sharing the carrier can be guaranteed on a long term basis, N>6 or N>10. An illustration of this is provided in FIG. 1 wherein the time provisioned comprises gap 112.

In one embodiment, N can be 7 or 9, 8 or 10, or higher, depending on whether the absence of any other technology sharing the carrier can be guaranteed on a long term basis or not. In another embodiment, N is configured by eNB through higher layer signaling or activation/release downlink control information (DCI).

CWS Updated Through the Use of a Timer

In one embodiment, the value of N can be counted through a timer. In one embodiment, the timer starts:

1. At the start of the previous Category 4 LBT transmission

2. Four subframes after the start of the previous Category 4 LBT transmission

3. At the end of the previous Category 4 LBT transmission.

In one embodiment, if the UE does not receive any UL grant or AUL DFI upon the expiration of the timer, the CWS of all priority classes is increased to the next higher value. In one embodiment, the timer is reset to its initial value upon expiration of the timer. In one embodiment, the CWS value is unchanged until the timer expires. In one embodiment, the UE does not increase the CWS value for the same HARQ_ID_ref upon reception of UL grant or AUL DFI, if the UE already increased the CWS upon expiration of the timer.

In one embodiment, if the UE starts Category 4 LBT before the expiration of the timer, the UE must update the CWS and redraw the counter value if:

I. The UE does not receive any UL grant or AUL DFI upon the expiration of the timer; or II. A UL grant is received and the NDI bit of the active HARQ processes of HARQ_ID_ref is not toggled; or III. A UL grant is received and does not schedule HARQ_ID_ref; or IV. An AUL DFI is received and indicates NACK for the active HARQ processes (i.e. TB not disabled) of HARQ_ID_ref CWS Update Based on UL Grant or AUL-DFI DCI Reception In one embodiment, if a UE does not receive any UL grant or AUL-DFI DCI after the previous Category 4 LBT transmission, the CWS for the following AUL transmission is increased to the next higher value for all priority classes. In one embodiment, if the CWS is reset while the UE is already in Category 4 LBT, it is up to UE whether to redraw the random counter value or not. In one embodiment, the UE does not increase the CWS value for the same HARQ_ID_ref upon reception of UL grant or AUL DFI.

CWS Update in Case Neither UL 2Grant nor AUL-DFI is Received

Figure 2:
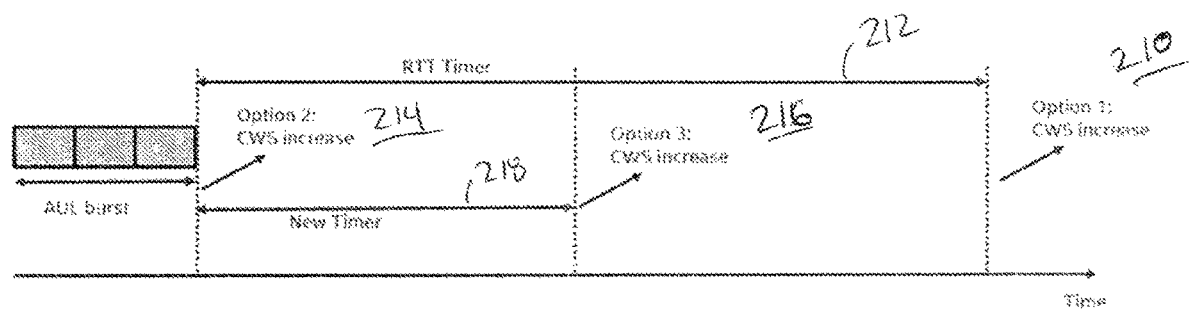
FIG. 2 is a diagram of CWS update options when neither an UL grant or an AUL-DFI is received in accordance with one or more embodiments.

Referring now to FIG. 2, a diagram of CWS update options when neither an UL grant or an AUL-DFI is received in accordance with one or more embodiments will be discussed. In this section, multiple options are provided on how to update the CW size when neither UL grant not AUL-DFI is received. In one embodiment, as a first option 210 if neither an UL grant nor AUL-DFI is received, the CWS remains unchanged until the round-trip time (RTT) timer 212 for a specific ID process expires, and only after its expiration the CWS value is updated and increased to the higher value. In one embodiment, as a second option 214 the CWS is increased to the higher value soon after the AUL transmission is initiated regardless of the RTT timer 212, and the reception of an UL grant or the AUL-DFI. In one embodiment, as a third option 216 a new timer 218 is defined. The timer 218 starts counting soon after an AUL transmission is performed, and the CWS is increased to the higher value once the timer 218 expires. In one embodiment, the value of the timer 218 is defined in the specification (i.e., 4 ms or 6 ms or 8 ms). In one embodiment, the value of the timer 218 can be configured, or it can be fixed. An illustration of the three options described above is provided in FIG. 2.

Figure 3:
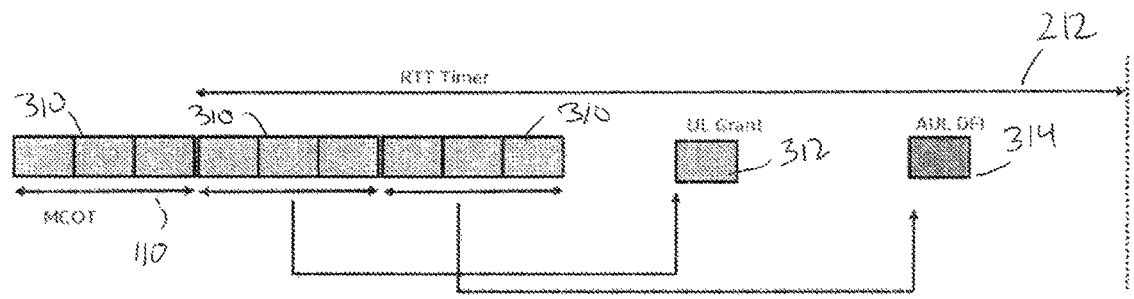
FIG. 3 is a diagram of consecutive AUL bursts in accordance with one or more embodiments.
Figure 4:
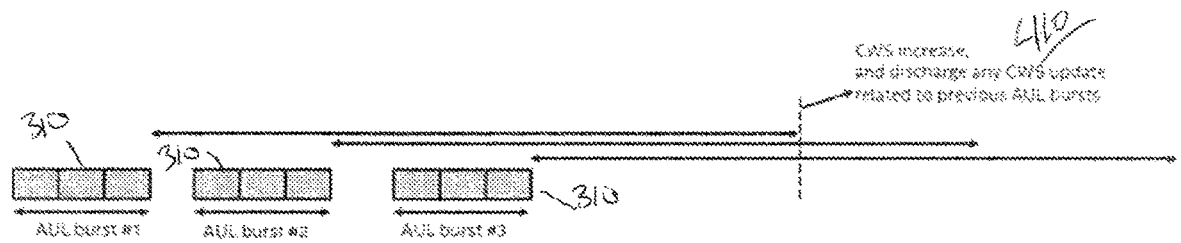
FIG. 4 is a diagram illustrating CWS adjustment for multiple AUL bursts in accordance with one or more embodiments.

CWS Update for the Case of Multiple Consecutive AUL Bursts without Waiting for UL 2Grant or AUL-DFI Referring now to FIG. 3 and FIG. 4, diagrams of consecutive AUL bursts in accordance with one or more embodiments will be discussed. In this section, different options on how to update CWS are provided for the case multiple consecutive AUL bursts are performed, as illustrated in FIG. 3. In one embodiment, if multiple consecutive AUL bursts 310 are performed without waiting for the reception of an UL grant 312 or AUL-DFI 314 for the first AUL burst, and for all of them neither UL grants nor AUL-DFI are received, the CWS is adjusted only once at the end of the RTT timer 212 for the first AUL burst, and the CWS adjustment consequent to the other bursts is discharged. In other words, given multiple AUL UL bursts 310, if no UL grant 312 or AUL-DFI 314 is received for any of the AUL bursts 310, once the RTT timer 212 for the first burst expires, the CWS is increased at 410 to the higher value, and the CWS will not be adjusted during a consequent reception of UL grant 312 and AUL-DFI 312 for the previous AUL bursts. This is illustrated in FIG. 4.

Figure 5:
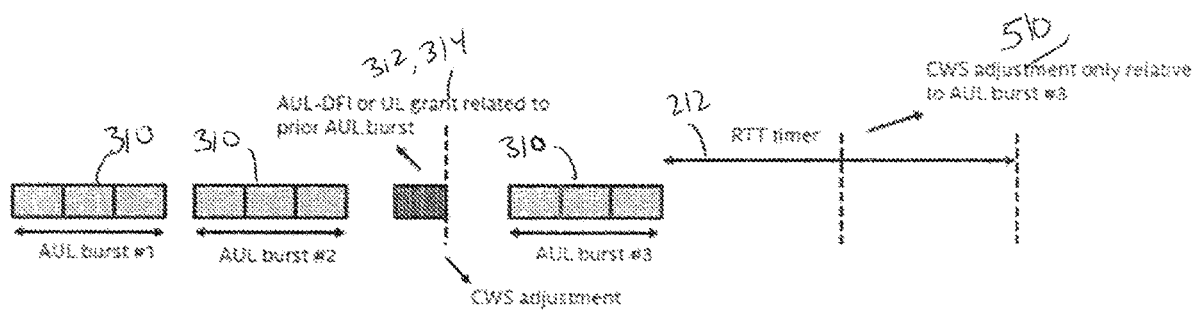
FIG. 5 is a diagram further illustrating CWS adjustment for multiple AUL bursts in accordance with one or more embodiments.

Referring now to FIG. 5, a diagram further illustrating CWS adjustment for multiple AUL bursts in accordance with one or more embodiments will be discussed. In one embodiment, if multiple consecutive AUL bursts 310 are performed, no CWS adjustment is executed until the RTT timer 212 expires or an UL grant 312 or AUL-DFI 314 is received for the first AUL burst, even if in between other UL grants 312 or AUL-DFI 314 are received for the subsequent AUL bursts. In one embodiment, if multiple consecutive AUL bursts 310 are performed, and an UL grant 312 or AUL-DFI 314 is received in between, the CWS is adjusted accordingly at 510, and no CWS adjustment will be executed as a consequent reception of UL grant 312 and AUL-DFI 314 for the AUL bursts prior the CWS adjustment related to currently received UL grant 312 or AUL-DFI 314. An illustration of this is provided in FIG. 5.

In one embodiment, the CWS is increased and adjusted for each AUL burst 310 independently of their RTT timer 212 and whether UL grants 312 or AUL-DFIs 314 are received. In one embodiment, for the case of multiple AUL bursts 310, the CWS is adjusted each time their RTT timer 212 is received, or an UL grant 312 or AUL-DFI 314 is received. In one embodiment, the CWS is not adjusted for the case of multiple consecutive AUL bursts 310 without waiting for UL grant 312 or AUL-DFI 314 until the UE is not allowed to perform Cat-4 LBT and transmit or retransmit AUL.

AUL within eNB Acquired MCOT

In one embodiment, the eNB acquired MCOT is not used for any AUL transmissions. In one embodiment, the eNB acquired MCOT is allowed for AUL transmissions, and in order to increase the chances of an AUL UE to acquire the medium, the AUL UE uses single shot LBT (25 µs LBT) to access the channel. The AUL transmissions of a UE within the shared COT is contiguous, where a short gap is allowed between subframes in order to avoid UEs to monopolize the medium and offer a fair share to the channel to other devices. In one embodiment, DL-UL-DL is not allowed, and the AUL transmission within the eNB acquired MCOT does not continue beyond the last indicated UL subframe. In one embodiment, in order to ensure that the UE transmits data of the appropriate priority class in the shared COT, and that the correct LBT priority class to traffic map is used, only UEs that are able to fully utilize the advertised resources are enabled to perform AUL transmission and acquire the medium. This can be left to UE's implementation. In particular, if a UE has enough data to fill in the eNB acquired COT broadcasted in the C-PDCCH with same traffic access priority or higher than the one indicated by the UE, the UE can perform AUL during the COT acquired and shared by the eNB, otherwise AUL is forbidden.

CWS Update within eNB Acquired MCOT

Another aspect that needs to be considered in the context of AUL transmission within the eNB acquired MCOT is the contention window (CW) update for the eNB. In this case two scenarios can occur. In a first scenario, the eNB performs physical downlink shared channel (PDSCH) transmissions, and part of the acquired MCOT is configured for UL transmissions with overlapping time-domain resources for AUL transmissions. In this case, in one embodiment the UL transmissions are not considered for the CW update. In a second scenario, the eNB does not perform any PDSCH transmissions, and part of the acquired MCOT is configured for UL transmissions with overlapping time-domain resources for AUL transmissions. In this last case, in one embodiment the UL transmissions (SUL/AUL) should be considered for the CW update, similarly as in 3GPP Release 14, during which it was agreed that if eNB schedules UL transport blocks (TBs) with 25 µs LBT in a shared COT without any PDSCH the eNB increases the CWS if less than 10% of the scheduled UL TBs are not successfully received. The main difference here, however, compared to Release 14 is that the eNB does not know with certainty if a UE has accessed the channel and performed transmission, but it can only attempt to detect the AUL transmission. In this case, in one embodiment if the eNB does not perform any PDSCH transmissions in the COT, and if less than 10% of the schedule UL TBs and the AUL TBs, which are detected by the eNB, are not successfully received, the CWS is increased to the higher value, otherwise the eNB resets its CW.

Figure 6:
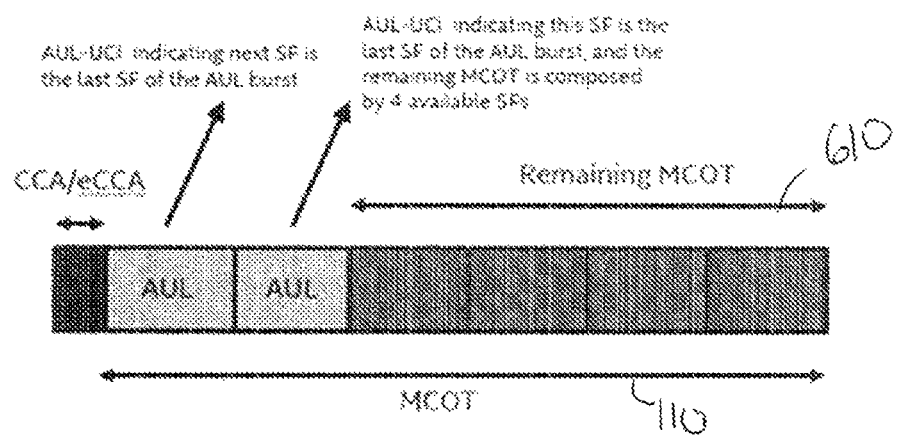
FIG. 6 is a diagram illustrating MCOT sharing in accordance with one or more embodiments.

Referring now to FIG. 6, a diagram illustrating MCOT sharing in accordance with one or more embodiments will be discussed. When an AUL UE acquires the channel by performing a channel access procedure, the UE is allowed to fully utilize the acquired resources, but in case if the resources are not used, they are wasted. The European Telecommunications Standards Institute (ETSI) regulation, however, allows a UE that acquired an MCOT 110 to share it with an eNB. This has many resemblances with the optional protocol called reverse direction (RD) in Wi-Fi. This protocol has the aim to efficiently transfer data between two Institute of Electrical and Electronics Engineers (IEEE) 802.11 devices during a transmission opportunity (TxOP) by eliminating the need for either device to initiate a new data transfer.

In one embodiment, the remaining MCOT 610 acquired by a UE is share with an eNB. In one embodiment, the UE provides information through the AUL-UCI of the remaining MCOT 610 to the eNB, and it is up to the eNB whether to use the remaining MCOT or not. An illustration of this is provided in FIG. 6.

In one embodiment, the eNB that utilizes the remaining MCOT acquired by an AUL UE is allowed to transmit only to the UE that is sharing its MCOT. In one embodiment, the eNB is allowed to transmit to any UE over the remaining MCOT. In one embodiment, a gap is left between AUL transmission and the eNB start of the transmission, which is due to processing delays necessary for the eNB to decode the AUL-UCI information, which contains information regarding the start and/or end of the remaining MCOT shared with the eNB. In one embodiment, the processing delay is 1 ms long, meaning that the first subframe (SF) after the AUL burst within the MCOT acquired by the UE cannot be utilized for transmissions by the eNB.

SUL/AUL Channel Access Mechanisms

The reference subframe (SF) is the first SF of the most recent uplink burst (SUL/AUL) of contiguous SFs that is transmitted after performing a Category 4 listen before talk (LBT) procedure at least four SFs prior to a UL grant reception or an AUL-DFI. If an UL grant or an AUL-DFI is received, the CWS for all the priority classes is done as follows.

The contention window size at the UE is reset for all the priority classes if:

A UL grant is received and the NDI bit for at least one of the active HARQ processes (i.e. TB not disabled) associated with HARQ_ID_ref is toggled; OR An AUL-DFI is received and indicates ACK for at least one of the active HARQ processes (i.e. TB not disabled) associated with HARQ_ID_ref The contention window size of all priority classes at the UE is increased to the next higher value if:

A UL grant is received and the NDI bit(s) of all the active HARQ process or processes for the reference subframe are not toggled; OR A UL grant is received and does not schedule any active HARQ process (i.e. TB not disabled) for the reference subframe; OR An AUL-DFI is received which does not indicate ACK for at least one of the active HARQ processes for the reference subframe.

The CWS is reset to the minimum value if the maximum CWS is used for K consecutive LBT attempts for transmission only for the priority class for which maximum CWS is used for K consecutive LBT attempts, where K is selected by UE implementation from the set of values from (1, . . . , 8). The NDI value(s) received in the UL grant or the HARQ-ACK value(s) received in the earliest AUL-DFI after n_ref+3 is used for adjusting the CWS, where n_ref is the reference subframe, and HARQ_ID_ref is the HARQ ID of n_ref.

If there exists at least one previous Cat-4 LBT UL transmission, from the start SF of which N or more SFs have elapsed and neither UL grant nor AUL DFI is received, where N=max (X, corresponding UL burst length+1) if X>0 and N=0 otherwise:
  X is a RRC configured value, where
    X is equal to 0 or 5 SFs if the absence of other technologies on the same carrier cannot be guaranteed.
    X is equal to 0 or 10 SFs if the absence of other technologies on the same carrier can be guaranteed.
  For each previous Cat-4 LBT (SUL/AUL) transmission from the start SF of which, N or more SFs have elapsed and neither UL grant nor AUL DFI is received
    The contention window size of all priority classes at the UE is increased to the next higher value
    Each such previous Category 4 LBT transmission is used to adjust the CWS only once.
Else, if the UE starts a new Cat-4 LBT UL transmission before N subframes have elapsed from the previous CAT.4 LBT and neither UL grant nor AUL DFI is received, the CWS is unchanged.

If the UE receives feedback for one or more previous Cat-4 LBT (SUL/AUL) transmission from the start SF of which, N or more SFs have elapsed and neither UL grant nor AUL DFI was received, the UE may recompute the CWS as follows.
  Step 1: The UE reverts the CWS to the value used to transmit the first burst of such previous Cat-4 LBT transmission(s)
  Step 2: The UE updates the CWS sequentially in order of the transmission of bursts:
    if the feedback indicates ACK for the first SF of the burst, CWS is reset
    else (if the feedback indicates NACK or there is no feedback for the first SF of the burst), the CWS is doubled
If the UE CWS changes while a Cat-4 LBT procedure is ongoing, the UE draws a new random backoff counter and applies it to the ongoing LBT procedure.

COT Sharing: UL to DL

A COT acquired by a UE using Cat-4 LBT for AUL transmission can be shared with the eNB. To utilize the COT acquired by the UE, the eNB shall send DL control information, including AUL-DFI or UL grant, to the UE which acquired the COT within the remaining COT. For DL transmission within the UE acquired COT, the DL transmission is limited to a partial ending subframe of up to 2 OS length. The eNB may send control information to any UE. The last symbol of the AUL burst shall be dropped. UL-DL-UL sharing is not allowed.

Content within the Remaining MCOT

In one embodiment, the eNB is only allowed to transmit physical downlink control channel (PDCCH) carrying downlink (DL) control information. In one embodiment, the eNB transmits only over a few symbols, for example thee orthogonal frequency division multiplexing (OFDM) symbols, the control information. In one embodiment, the eNB transmits the DL control information to any UEs within the indicated DL subframe. In one embodiment, UL-DL-UL sharing is not allowed. In one embodiment, UL-DL-UL sharing is allowed, as illustrated by FIG. 7, below.

Figure 7:
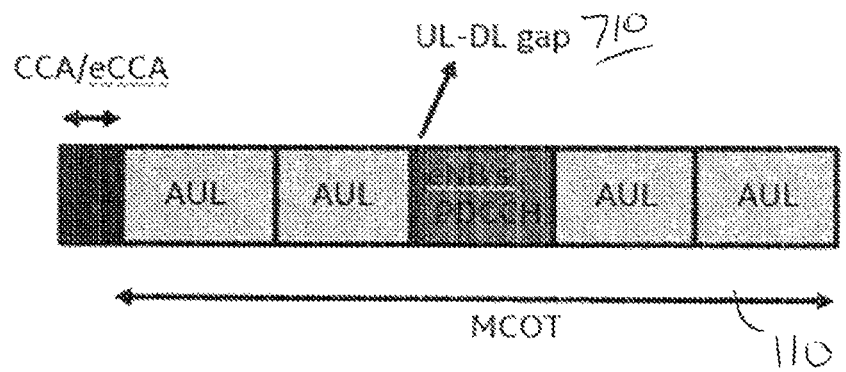
FIG. 7 is a diagram illustrating UL-DL-UL sharing in accordance with one or more embodiments.

Referring now to FIG. 7, a diagram illustrating UL-DL-UL sharing in accordance with one or more embodiments will be discussed. In one embodiment, the eNB does not need to perform LBT if the gap 710 between UL and DL is lower than 16 μs, otherwise the eNB performs type 2 channel access (25 μs LBT) every time it performs a DL transmission if the gap is between 16 μs and 25 μs. In one embodiment, if the gap is longer than 25 μs, type 1 channel access is performed. In one embodiment, DL transmission is only allowed if the gap is ⇐25 μs.

In one embodiment, data can be aggregated to the DL control information transmitted on the remaining MCOT, and they can be only devoted to the UE that acquired the MCOT. In one embodiment, both data and DL control information can be devoted to any UE within the MCOT acquired by a specific AUL UE. In one embodiment, the remaining MCOT remains unutilized and is not shared with the eNB.

UCI Signaling

In one embodiment, the UE can inform the eNB about the remaining MCOT through the AUL-UCI. In one embodiment, 3 or 4 bits are utilized to inform the eNB about the length of the remaining MCOT and another 3 or 4 bits are utilized to provide information regarding the end of the AUL transmission performed over the acquired MCOT. In one embodiment, only 3 or 4 bits are used, and the length of the remaining MCOT as well as the information related to the end of the AUL transmission is jointly provided. For example, the following table can be used.

TABLE 2

Separate indication for AUL end and length of remaining MCOT

| Indicator | Info related to end of AUL | Info related to length of remaining MCOT |
| --- | --- | --- |
| "000" | No subsequent GUL subframe | No subframe can be shared |
| "001" | 1 remaining AUL subframe | 1 subframe can be shared |
| "010" | 2 remaining AUL subframes | 2 subframes can be shared |
| "011" | 3 remaining AUL subframes | 3 subframes can be shared |
| "100" | 4 remaining AUL subframes | 4 subframes can be shared |
| "101" | 5 remaining AUL subframes | 5 subframes can be shared |
| "110" | 6 remaining AUL subframes | 6 subframes can be shared |
| "111" | 7 remaining AUL subframes | 7 subframes can be shared |

TABLE 3

Example of joint indication for AUL end and length of remaining MCOT

| Indicator | Meaning |
| --- | --- |
| "000" | The following subframe can be shared, and the remaining COT is 8 subframes |
| "001" | The following subframe can be shared, and the remaining COT is 7 subframes |
| "010" | The following subframe can be shared, and the remaining COT is 6 subframes |
| "011" | The following subframe can be shared, and the remaining COT is 5 subframes |
| "100" | The following subframe can be shared, and the remaining COTis 4 subframes |

TABLE 3-continued

Example of joint indication for AUL end and length of remaining MCOT

| Indicator | Meaning |
| --- | --- |
| "101" | The following subframe can be shared, and the remaining COT is 3 subframes |
| "110" | The following subframe can be shared, and the remaining COT is 2 subframes |
| "111" | The following subframe can be shared, and the remaining COT is 1 subframe |

In one embodiment, either the most significant bit (MSB) or the least significant bit (LSB) is used to indicate whether the first available SF can be used or not due to processing delays. In one embodiment, in case the MCOT is only used for DL control information, only one bit is used in the uplink control information (UCI) to inform the eNB that the following subframe is the last SF for the AUL UL burst, and either in the next subframe or in two subframes from the next (if a processing delay of 1 ms is necessary), the eNB is allowed to transmit DL control information. In one embodiment, the UE can only provide the end of the AUL transmission but does not need to indicate the length of the remaining COT since the eNB only transmits DL control information through a limited number of OFDM symbols.

Figure 8:
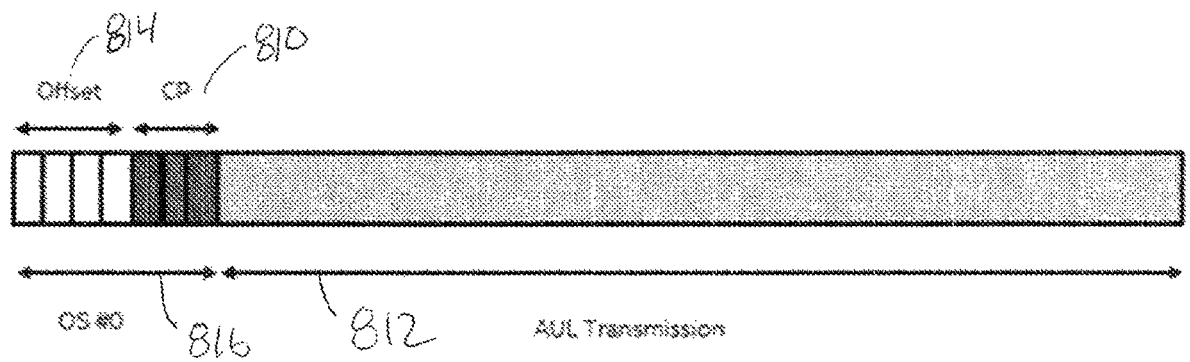
FIG. 8 is a diagram of an AUL-specific offset to defer AUL transmission in accordance with one or more embodiments.

Referring now to FIG. 8, a diagram of an AUL-specific offset to defer AUL transmission in accordance with one or more embodiments will be discussed. According to current agreements, a UE can be configured via higher layer signaling on the time domain resources that are allowed for AUL transmission. Therefore, the eNB can have some level of controllability to coordinate the SUL and AUL transmissions. The eNB, however, can transmit DL or schedule UL transmissions in a subframe, which is configured for AUL transmission as well. For such cases, there is a need to consider how to avoid collisions between the scheduled transmissions and AUL. It is also possible that the AUL transmissions can collide with each other as well. In this invention, we disclose different options on how to mitigate the inter-cell interference for both AUL operating in full bandwidth and partial bandwidth mode.

TDM'ed AUL Access

In one embodiment, for AUL operating in full bandwidth mode, the UE is configured with an AUL-specific PUSCH start offset value for AUL transmission, which is used to defer the AUL transmission, and provide the UEs with different priority to access the channel mitigating the change of colliding with each other. In one embodiment, the PUSCH transmission always starts from symbol #1, and cyclic prefix (CP) extension 810 is applied between the start of AUL transmission 812, and the beginning of symbol #1, as illustrated in FIG. 8.

In one embodiment, a set of offset values 814 that define the start of AUL transmission 812 within symbol #0 816 is defined in the specification, as well as the granularity between offset values. For example, the granularity can be 9 µs which is the slot time for Wi-Fi, or 5 µs or 10 µs or another value, while the set of offset values can be as an example {16, 25, 34, 43, 52, 61 us and OS #1}. An illustration of the possible AUL starting positions is provided in FIG. 9, below.

Figure 9:
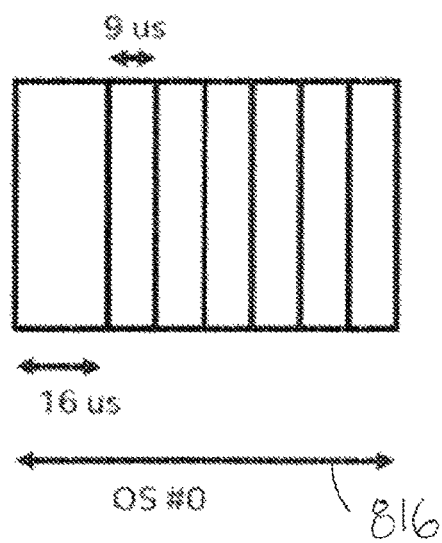
FIG. 9 is a diagram of AUL starting positions in accordance with one or more embodiments.

Referring now to FIG. 9, a diagram of AUL starting positions in accordance with one or more embodiments will be discussed. In one embodiment, the AUL transmission can start from the subframe boundary. In one embodiment, the set of offset values that can be used when the AUL transmission is performed in the MCOT acquired by eNB are different than those used to perform AUL transmission outside of the MCOT acquired by eNB. In one embodiment, the offset values used for AUL transmissions inside of the eNB acquired MCOT are a subset of those that can be used for AUL transmission outside of the MCOT. For example, for AUL transmissions performed in the MCOT acquired by eNB the starting position of the AUL transmission can be selected from the set {34, 43, 52, 61 us and start of OS #1}, while for AUL transmissions performed outside the MCOT acquired by eNB the starting position can be selected from the set {16, 25, 34, 43, 52, 61 us and start of OS #1}. For AUL transmissions performed within the acquitted MCOT, LBT type 2 must be performed (25 µs LBT), furthermore we must ensure that SUL has higher priority than AUL. For the aforementioned reasons, the offset value smaller or equal than 25 µs, are not allowed, and all values less than these values are precluded.

In one embodiment, an AUL UE can be configure through radio resource control (RRC) signaling or through the activation/deactivation DCI to use a different value range for AUL transmission within the MCOT acquired by eNB, and for AUL transmissions outside the MCOT acquired by eNB. In one embodiment, the set of values can be fixed for either AUL transmissions outside the MCOT acquired by eNB or AUL transmissions inside the MCOT acquired by eNB, and the set of value can be RRC configured for the other case. For example, for AUL transmissions outside the MCOT acquired by eNB, the set of values is fixed, while for AUL transmissions inside the MCOT acquired by eNB, the set of value is RRC configured.

In one embodiment, the AUL UEs can be configured with different set of values, and the selection is done for example such that adjacent UEs are not allowed to select the same offset value: for example given UE #1-3, the AUL UE #1 is configured to use {16, 25} µs, the AUL UE #2 is configured to use {34, 43} µs, and the AUL UE #3 is configured to use {52, 61} µs. In one embodiment, given a certain set of offset values that an AUL UE can select, the AUL UE perform the selection randomly, such that each value has the same probability to be extracted and used. In one embodiment, the AUL UE can inform the eNB about the value that has been selected by signaling this value through the UCI. In one embodiment, the AUL UE does not inform the eNB about the offset value that has selected. In one embodiment, given a set of offset value, the eNB selects the offset value for each UE, and configures each UE with a particular value to start AUL transmission.

FDM'ed AUL Access

In the case of FDM'ed AUL transmission, a UE starting transmission earlier can make the LBT failed at the UEs who have chosen a relatively longer random offset. Therefore, in the case of FDM'ed AUL transmissions, a common offset is necessary. Motivated by this, in one embodiment, for AUL operating in partial bandwidth mode, the UE is configured with a common AUL-specific PUSCH start offset value for AUL transmission. In one embodiment, similarly as for the TDM'ed case the PUSCH transmission always starts from symbol #1, and CP extension is applied between the common start of AUL transmission, and the beginning of symbol #1.

In one embodiment, a set of offset values that can be chosen as the start of AUL transmission within symbol #0 is defined in the spec, as well as the granularity between offset values. In one embodiment, the defined set of values is the same as that defined for TDM'ed mode. In one embodiment, the set of values for FDM'ed mode is differently defined than that for TDM'ed mode. In one embodiment, the AUL transmission can start from the subframe boundary. In one embodiment, the set of offset values among which the AUL starting position can be chosen when the AUL transmission is performed in the MCOT acquired by eNB are different than those used to perform AUL transmission outside of the MCOT acquired by eNB. In one embodiment, the offset values used for AUL transmissions inside of the eNB acquired MCOT are a subset of those that can be used for AUL transmission outside of the MCOT. For example, for AUL transmissions performed in the MCOT acquired by eNB, the common starting position of the AUL transmission can be selected from the set {34, 43, 52, 61 µs and start of OS #1}, while for AUL transmissions performed outside the MCOT acquired by eNB the common starting position can be selected from the set {16, 25, 34, 43, 52, 61 µs and start of OS #1}. For AUL transmissions performed within the acquired MCOT, LBT type 2 must be performed (25 µs LBT). Furthermore, when operating in the MCOT acquired by the eNB, we must guarantee that SUL has higher priority than AUL. For the aforementioned reasons, the offset values smaller or equal than 25 us are not allowed (all values less or equal than 25 µs are precluded). In one embodiment, the common AUL-specific offset is configured by the eNB through RRC signaling or through the activation/deactivation DCI.

UL Starting Positions

With the aim to mitigate collisions and blocking among AUL UEs and SUL UEs, different starting positions are introduced between symbol #0 and symbol 1. CP extension is transmitted from the AUL starting position until the start of symbol #1 and is less than one symbol long. For full channel bandwidth, UE selects randomly the starting position from a separate AUL-specific set of PUSCH starting offset values for each of the following cases:

For AUL transmissions outside of eNB obtained MCOT, the configured set is a subset of {16, 25, 34, 43, 52, 61, OS #1}.

For AUL transmissions inside of eNB obtained MCOT, the configured set is a subset of {34, 43, 52, 61, OS #1}.

For partial channel bandwidth, the UE is RRC configured with exact AUL-specific PUSCH start offset value. The set of values for AUL transmission outside of eNB obtained MCOT and for the AUL transmission inside of eNB obtained MCOT are the same as those defined for AUL UEs configured to occupy the full channel bandwidth.

Figure 10:
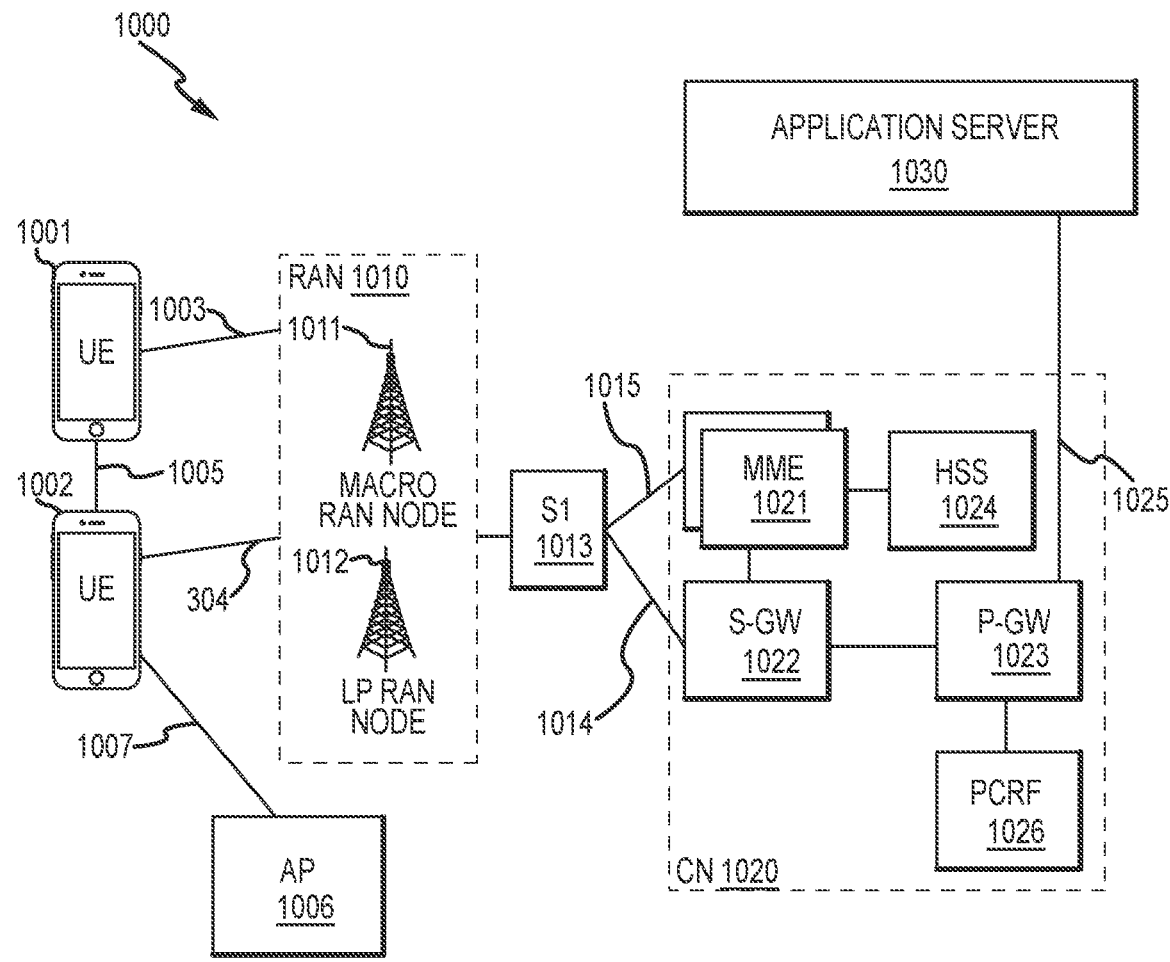
FIG. 10 illustrates an architecture of a system of a network in accordance with some embodiments.

FIG. 10 illustrates an architecture of a system 1000 of a network in accordance with some embodiments. The system 1000 is shown to include a user equipment (UE) 1001 and a UE 1002. The UEs 1001 and 1002 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1001 and 1002 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 and 1002 may be configured to connect, e.g., communicatively couple, with a radio access network (RAN) 1010—the RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections 1003 and 1004, respectively, each of which comprises a physical communications interface or layer (discussed in further detail below); in this example, the connections 1003 and 1004 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a ProSe interface 1005. The ProSe interface 1005 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1002 is shown to be configured to access an access point (AP) 1006 via connection 1007. The connection 1007 can comprise a local wireless connection, such as a connection consistent with any IEEE 802.11 protocol, wherein the AP 1006 would comprise a wireless fidelity (WiFi®) router. In this example, the AP 1006 is shown to be connected to the Internet without connecting to the core network of the wireless system (described in further detail below).

The RAN 1010 can include one or more access nodes that enable the connections 1003 and 1004. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., low power (LP) RAN node 1012.

Any of the RAN nodes 1011 and 1012 can terminate the air interface protocol and can be the first point of contact for the UEs 1001 and 1002. In some embodiments, any of the RAN nodes 1011 and 1012 can fulfill various logical functions for the RAN 1010 including, but not limited to, radio network controller (RNC) functions such as radio bearer management, uplink and downlink dynamic radio resource management and data packet scheduling, and mobility management.

In accordance with some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1001 and 1002. The physical downlink control channel (PDCCH) may carry information about the transport format and resource allocations related to the PDSCH channel, among other things. It may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1011 and 1012 based on channel quality information fed back from any of the UEs 1001 and 1002. The downlink resource assignment information may be sent on the PDCCH used for (e.g., assigned to) each of the UEs 1001 and 1002.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1010 is shown to be communicatively coupled to a core network (CN) 1020—via an S1 interface 1013. In embodiments, the CN 1020 may be an evolved packet core (EPC) network, a NextGen Packet Core (NPC) network, or some other type of CN. In this embodiment the S1 interface 1013 is split into two parts: the S1-U interface 1014, which carries traffic data between the RAN nodes 1011 and 1012 and the serving gateway (S-GW) 1022, and the S1-mobility management entity (MME) interface 1015, which is a signaling interface between the RAN nodes 1011 and 1012 and MMEs 1021.

In this embodiment, the CN 1020 comprises the MMEs 1021, the S-GW 1022, the Packet Data Network (PDN) Gateway (P-GW) 1023, and a home subscriber server (HSS) 1024. The MMEs 1021 may be similar in function to the control plane of legacy Serving General Packet Radio Service (GPRS) Support Nodes (SGSN). The MMEs 1021 may manage mobility aspects in access such as gateway selection and tracking area list management. The HSS 1024 may comprise a database for network users, including subscription-related information to support the network entities' handling of communication sessions. The CN 1020 may comprise one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 may terminate the S1 interface 1013 towards the RAN 1010, and routes data packets between the RAN 1010 and the CN 1020. In addition, the S-GW 1022 may be a local mobility anchor point for inter-RAN node handovers and also may provide an anchor for inter-3GPP mobility. Other responsibilities may include lawful intercept, charging, and some policy enforcement.

The P-GW 1023 may terminate an SGi interface toward a PDN. The P-GW 1023 may route data packets between the EPC network 1023 and external networks such as a network including the application server 1030 (alternatively referred to as application function (AF)) via an Internet Protocol (IP) interface 1025. Generally, the application server 1030 may be an element offering applications that use IP bearer resources with the core network (e.g., UMTS Packet Services (PS) domain, LTE PS data services, etc.). In this embodiment, the P-GW 1023 is shown to be communicatively coupled to an application server 1030 via an IP communications interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

The P-GW 1023 may further be a node for policy enforcement and charging data collection. Policy and Charging Enforcement Function (PCRF) 1026 is the policy and charging control element of the CN 1020. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

Figure 11:
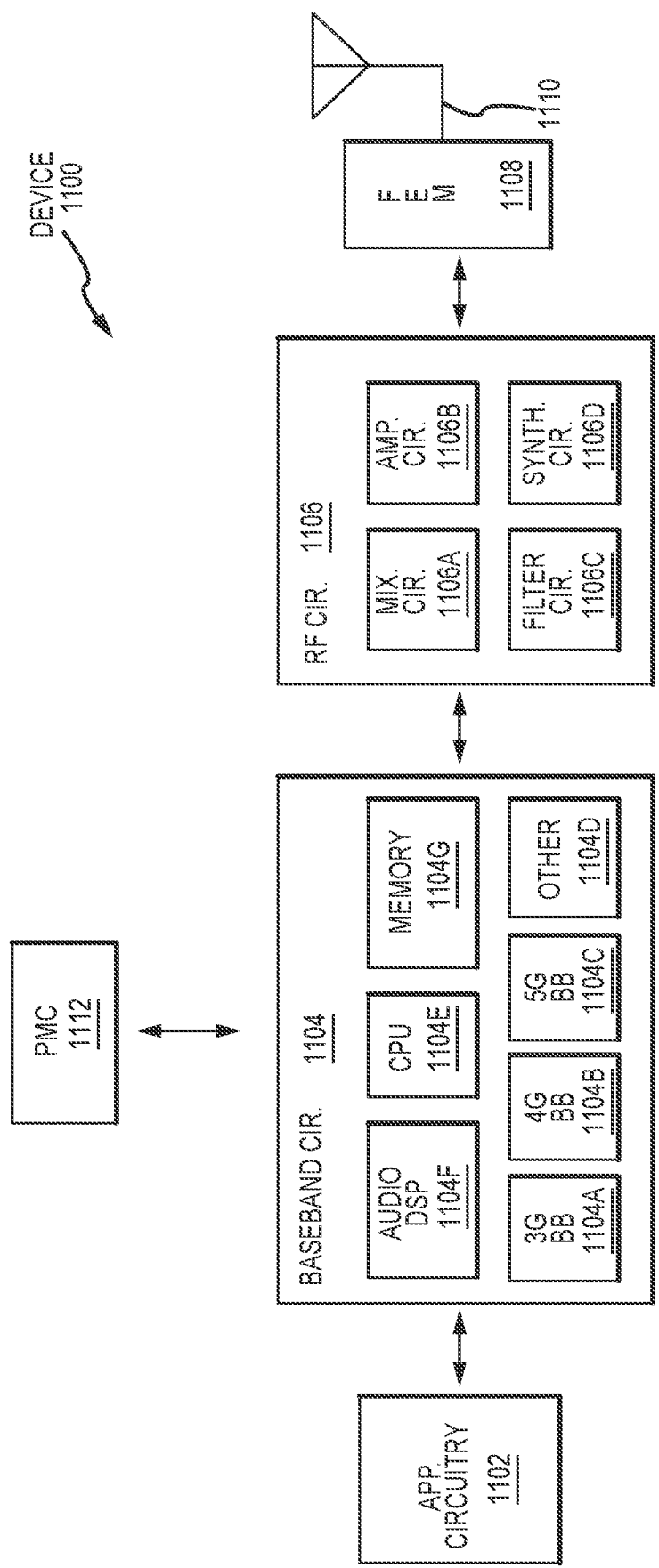
FIG. 11 illustrates example components of a device in accordance with some embodiments.

FIG. 11 illustrates example components of a device 1100 in accordance with some embodiments. In some embodiments, the device 1100 may include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 may be included in a UE or a RAN node. In some embodiments, the device 1100 may include less elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1106 and to generate baseband signals for a transmit signal path of the RF circuitry 1106. Baseband processing circuity 1104 may interface with the application circuitry 1102 for generation and processing of the baseband signals and for controlling operations of the RF circuitry 1106. For example, in some embodiments, the baseband circuitry 1104 may include a third generation (3G) baseband processor 1104A, a fourth generation (4G) baseband processor 1104B, a fifth generation (5G) baseband processor 1104C, or other baseband processor(s) 1104D for other existing generations, generations in development or to be developed in the future (e.g., second generation (2G), sixth generation (6G), etc.). The baseband circuitry 1104 (e.g., one or more of baseband processors 1104A-D) may handle various radio control functions that enable communication with one or more radio networks via the RF circuitry 1106. In other embodiments, some or all of the functionality of baseband processors 1104A-D may be included in modules stored in the memory 1104G and executed via a Central Processing Unit (CPU) 1104E. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include one or more audio digital signal processor(s) (DSP) 1104F. The audio DSP(s) 1104F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106*d*. The amplifier circuitry 1106*b* may be configured to amplify the down-converted signals and the filter circuitry 1106*c* may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106*a* of the receive signal path may comprise passive mixers, although the scope of the embodiments is not limited in this respect.

In some embodiments, the mixer circuitry 1106*a* of the transmit signal path may be configured to up-convert input baseband signals based on the synthesized frequency provided by the synthesizer circuitry 1106*d* to generate RF output signals for the FEM circuitry 1108. The baseband signals may be provided by the baseband circuitry 1104 and may be filtered by filter circuitry 1106*c*.

In some embodiments, the mixer circuitry 1106*a* of the receive signal path and the mixer circuitry 1106*a* of the transmit signal path may include two or more mixers and may be arranged for quadrature downconversion and upconversion, respectively. In some embodiments, the mixer circuitry 1106*a* of the receive signal path and the mixer circuitry 1106*a* of the transmit signal path may include two or more mixers and may be arranged for image rejection (e.g., Hartley image rejection). In some embodiments, the mixer circuitry 1106*a* of the receive signal path and the mixer circuitry 1106*a* may be arranged for direct downconversion and direct upconversion, respectively. In some embodiments, the mixer circuitry 1106*a* of the receive signal path and the mixer circuitry 1106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect. In some embodiments, the synthesizer circuitry 1106*d* may be a fractional-N synthesizer or a fractional N/N+1 synthesizer, although the scope of the embodiments is not limited in this respect as other types of frequency synthesizers may be suitable. For example, synthesizer circuitry 1106*d* may be a delta-sigma synthesizer, a frequency multiplier, or a synthesizer comprising a phase-locked loop with a frequency divider.

The synthesizer circuitry 1106*d* may be configured to synthesize an output frequency for use by the mixer circuitry 1106*a* of the RF circuitry 1106 based on a frequency input and a divider control input. In some embodiments, the synthesizer circuitry 1106*d* may be a fractional N/N+1 synthesizer.

In some embodiments, frequency input may be provided by a voltage-controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106*d* of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110. In various embodiments, the amplification through the transmit or receive signal paths may be done solely in the RF circuitry 1106, solely in the FEM 1108, or in both the RF circuitry 1106 and the FEM 1108.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the PMC 1112 may manage power provided to the baseband circuitry 1104. In particular, the PMC 1112 may control power-source selection, voltage scaling, battery charging, or DC-to-DC conversion. The PMC 1112 may often be included when the device 1100 is capable of being powered by a battery, for example, when the device is included in a UE. The PMC 1112 may increase the power conversion efficiency while providing desirable implementation size and heat dissipation characteristics.

While FIG. 11 shows the PMC 1112 coupled only with the baseband circuitry 1104. However, in other embodiments, the PMC 11 12 may be additionally or alternatively coupled with, and perform similar power management operations for, other components such as, but not limited to, application circuitry 1102, RF circuitry 1106, or FEM 1108.

In some embodiments, the PMC 1112 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used execute Layer 3, Layer 2, or Layer 1 functionality, while processors of the application circuitry 1104 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
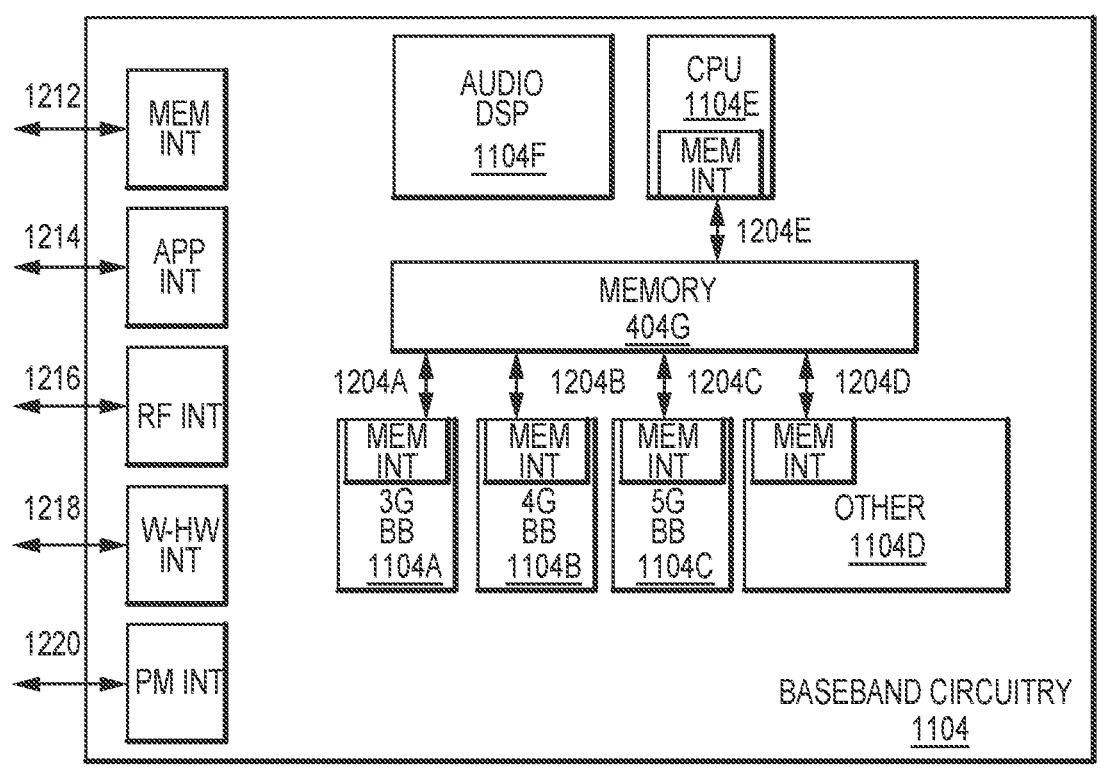
FIG. 12 illustrates example interfaces of baseband circuitry in accordance with some embodiments.

FIG. 12 illustrates example interfaces of baseband circuitry in accordance with some embodiments. As discussed above, the baseband circuitry 1104 of FIG. 11 may comprise processors 1104A-1104E and a memory 1104G utilized by said processors. Each of the processors 1104A-1104E may include a memory interface, 1204A-1204E, respectively, to send/receive data to/from the memory 1104G.

The baseband circuitry 1104 may further include one or more interfaces to communicatively couple to other circuitries/devices, such as a memory interface 1212 (e.g., an interface to send/receive data to/from memory external to the baseband circuitry 1104), an application circuitry interface 1214 (e.g., an interface to send/receive data to/from the application circuitry 1102 of FIG. 11), an RF circuitry interface 1216 (e.g., an interface to send/receive data to/from RF circuitry 1106 of FIG. 11), a wireless hardware connectivity interface 1218 (e.g., an interface to send/receive data to/from Near Field Communication (NFC) components, Bluetooth® components (e.g., Bluetooth® Low Energy), Wi-Fi® components, and other communication components), and a power management interface 1220 (e.g., an interface to send/receive power or control signals to/from the PMC 1112.

In the present description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled also may mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Although the claimed subject matter has been described with a certain degree of particularity, it should be recognized that elements thereof may be altered by persons skilled in the art without departing from the spirit and/or scope of claimed subject matter. It is believed that the subject matter pertaining to contention window adjustment mechanisms for FeLAA systems and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE) to operate in a License Assisted Access (LAA) network, comprising:
   radio frequency (RF) circuitry configured to communicate with the LAA network; and
   one or more baseband processors communicatively coupled to the RF circuitry and configured to perform operations, comprising:
   performing a Category 4 (Cat-4) Listen Before Talk (LBT) uplink (UL) transmission in the LAA network;
   transmitting autonomous UL (AUL) uplink control information (UCI) to the LAA network, the AUL UCI comprising a joint indication indicating both a remaining number of subframes to be used by the CAT-4 LBT UL transmission and a length of a remaining maximum channel occupancy time (MCOT);

when neither an UL grant nor an AUL downlink feedback indicator (DFI) is received after N subframes have elapsed since a first subframe of the Cat-4 LBT uplink transmission, increasing a value of a contention window size (CWS) of all priority classes at the UE to a next higher value; and when the UL grant is received and a new data indicator (NDI) bit for an active hybrid automatic repeat request (HARQ) processes of a hybrid automatic repeat request identity (HARQ_ID) reference (HARQ_ID_ref) is not toggled, updating the CWS and redrawing a counter value.

2. The apparatus of claim 1, the operations further comprising:
receiving the UL grant or the AUL DFI after increasing the value of the CWS size for all priority classes to a next higher value, wherein the CWS is maintained at a current value.

3. The apparatus of claim 1, the operations further comprising:
initiating LBT before expiration of a timer; and
updating the CWS and redrawing a counter value when: no UL grant or AUL DFI are received upon expiration of the timer or an AUL DFI is received and indicates negative acknowledgment (NACK) for the active HARQ processes of the HARQ_ID_ref wherein a transport block (TB) is not disabled.

4. The apparatus of claim 1, the operations further comprising:
increasing the CWS to a next higher value for a subsequent AUL transmission when no UL grant or AUL DFI is received after a previous LBT UL transmission.

5. The apparatus of claim 1, the operations further comprising:
redrawing a random counter value when the CWS is reset during an LBT UL transmission; and
when an UL grant or an autonomous UL (AUL) downlink feedback indicator (DFI) is received, maintaining the CWS at a same value.

6. One or more non-transitory machine readable media having instructions thereon that, when executed by an apparatus of a user equipment (UE) to operate in a License Assisted Access (LAA) network, result in:
performing Category 4 (Cat-4) Listen Before Talk (LBT) uplink (UL) transmission in the LAA system;
transmitting autonomous UL (AUL) uplink control information (UCI) to the LAA network, the AUL UCI comprising a joint indication indicating both a remaining number of subframes to be used by the CAT-4 LBT UL transmission and a length of a remaining maximum channel occupancy time (MCOT);
when neither an UL grant nor an autonomous UL (AUL) downlink feedback indicator (DFI) is received after N subframes have elapsed since a first subframe of the Cat-4 LBT uplink transmission, increasing a value of a contention window size (CWS) of all priority classes at the UE to a next higher value; and
when the UL grant is received and a new data indicator (NDI) bit for an active hybrid automatic repeat request (HARQ) processes of a hybrid automatic repeat request identity (HARQ_ID) reference (HARQ_ID_ref) is not toggled, updating the CWS and redrawing a counter value.

7. The one or more non-transitory machine readable media of claim 6, wherein the instructions, when executed, further result in receiving the UL grant or the AUL DFI, after increasing the value of the CWS size for all priority classes to a next higher value, wherein the CWS is maintained at a current value.

8. The one or more non-transitory machine readable media of claim 6, wherein the instructions, when executed, further result in starting an LBT UL transmission before expiration of a timer and to update the CWS and redrawing a counter value when: no UL grant or AUL DFI are received upon expiration of the timer or an AUL DFI is received and indicates negative acknowledgment (NACK) for the active HARQ processes of the HARQ_ID_ref wherein a transport block (TB) is not disabled.

9. The one or more non-transitory machine readable media of claim 6, wherein the instructions, when executed, further result in increasing the CWS to a next higher value for a subsequent AUL transmission when no UL grant or AUL DFI is received after a previous LBT UL transmission.

10. The one or more non-transitory machine readable media of claim 6, wherein the instructions, when executed, further result in redrawing a random counter value when the CWS is reset during an LBT UL transmission, and when an UL grant or an autonomous UL (AUL) downlink feedback indicator (DFI) is received, maintain the CWS at a same value.

11. A baseband processor configured to perform operations, comprising:
performing a Category 4 (Cat-4) Listen Before Talk (LBT) uplink (UL) transmission in the LAA system;
transmitting autonomous UL (AUL) uplink control information (UCI) to the LAA network, the AUL UCI comprising a joint indication indicating both a remaining number of subframes to be used by the CAT-4 LBT UL transmission and a length of a remaining maximum channel occupancy time (MCOT);
when neither an UL grant nor an autonomous UL (AUL) downlink feedback indicator (DFI) is received after N subframes have elapsed since a first subframe of the Cat-4 LBT uplink transmission, increasing a value of a contention window size (CWS) of all priority classes to a next higher value; and
when the UL grant is received and a new data indicator (NDI) bit for an active hybrid automatic repeat request (HARQ) processes of a hybrid automatic repeat request identity (HARQ_ID) reference (HARQ_ID_ref) is not toggled, updating the CWS.

12. The baseband processor of claim 11, wherein the operations further comprise:
receiving the UL grant or the AUL DFI, after increasing the value of the CWS size for all priority classes to a next higher value, wherein the CWS is maintained at a current value.

13. The baseband processor of claim 11, wherein the operations further comprise:
starting an LBT before expiration of a timer and to update the CWS and redraw a counter value when: no UL grant or AUL DFI are received upon expiration of the timer or an AUL DFI is received and indicates negative acknowledgment (NACK) for the active HARQ processes of the HARQ_ID_ref wherein a transport block (TB) is not disabled.

14. The baseband processor of claim 11, wherein the operations further comprise:
increasing the CWS to a next higher value for a subsequent AUL transmission when no UL grant or AUL DFI is received after a previous LBT UL transmission.

* * * * *